United States Patent [19]

Suman

[11] Patent Number: 4,899,975

[45] Date of Patent: Feb. 13, 1990

[54] FOLDABLE MOUNT

[75] Inventor: Michael J. Suman, Holland, Mich.

[73] Assignee: Prince Coporation, Holland, Mich.

[21] Appl. No.: 253,490

[22] Filed: Oct. 5, 1988

[51] Int. Cl.$^4$ .............................................. B60R 1/04
[52] U.S. Cl. ................................ 248/481; 248/288.3; 403/90
[58] Field of Search ............ 248/544, 549, 466, 475.1, 248/476, 479, 481, 482, 483, 484, 485, 486, 487, 288.3, 288.5, 324; 350/631, 632, 639; 403/90

[56] References Cited

U.S. PATENT DOCUMENTS

| | | |
|---|---|---|
| Re. 32,165 | 6/1986 | Gerring . |
| D. 282,733 | 2/1986 | Giavazzi et al. . |
| 1,639,441 | 8/1927 | Spahr ................................. 403/90 |
| 1,996,071 | 4/1935 | Kahn ................................. 403/90 |
| 2,071,883 | 2/1937 | Hodny .............................. 248/481 |
| 3,096,061 | 7/1963 | Bertell ............................. 248/481 |
| 3,367,616 | 2/1968 | Bausch ............................ 350/632 |
| 3,379,469 | 4/1968 | Elia . |
| 3,425,657 | 2/1969 | Doyle .............................. 248/481 |
| 3,471,115 | 10/1969 | Corbin ............................ 248/483 |
| 3,575,375 | 4/1971 | Strem ............................. 248/481 |
| 3,957,241 | 5/1976 | Morris ........................... 248/288.3 |
| 4,101,159 | 7/1978 | Stewart . |
| 4,149,749 | 4/1979 | Canal . |
| 4,352,518 | 10/1982 | Prince et al. . |
| 4,492,488 | 1/1985 | Warshawsky .................. 248/481 |
| 4,632,348 | 12/1986 | Keesling ........................ 248/481 |

FOREIGN PATENT DOCUMENTS

| | | | |
|---|---|---|---|
| 1455960 | 2/1969 | Fed. Rep. of Germany ...... 248/483 |
| 1963460 | 7/1971 | Fed. Rep. of Germany ...... 248/484 |
| 1504689 | 12/1967 | France ............................ 248/481 |
| 1517348 | 3/1968 | France ............................ 350/632 |
| 1084849 | 9/1967 | United Kingdom ............. 350/632 |
| 1137274 | 12/1968 | United Kingdom ............. 248/485 |

Primary Examiner—Blair M. Johnson
Assistant Examiner—Robert A. Olson
Attorney, Agent, or Firm—Price, Heneveld, Cooper, DeWitt & Litton

[57] ABSTRACT

A foldable mounting assembly for a vehicle accessory includes a base attached to a vehicle headliner and having a stem extending therefrom for attachment of a vehicle accessory such as a rearview mirror to an end of the stem opposite the base. A spring-loaded cam cooperatively interconnects the end of the stem to the base such that the stem and accessory attached thereto can be moved from a stored position closely adjacent the headliner for shipment thereof to a lowered locked-in-place use position.

10 Claims, 1 Drawing Sheet

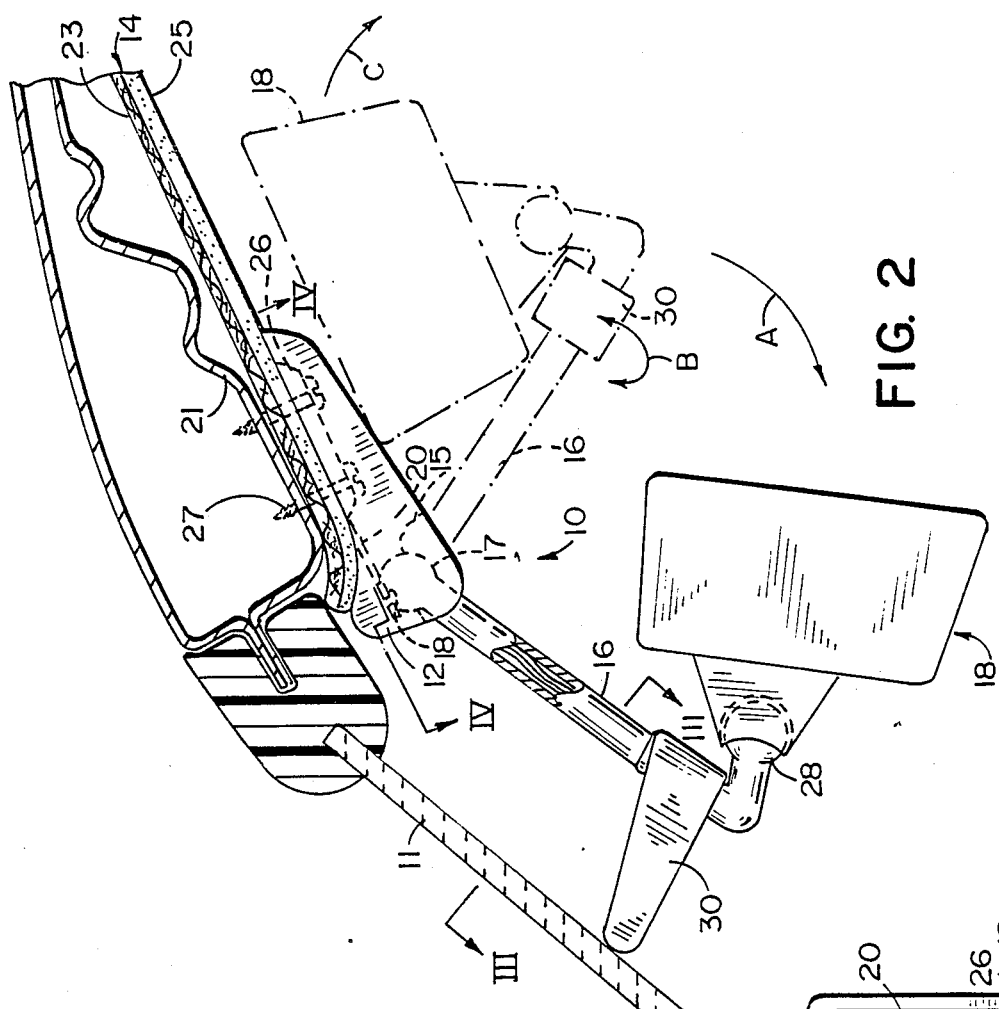
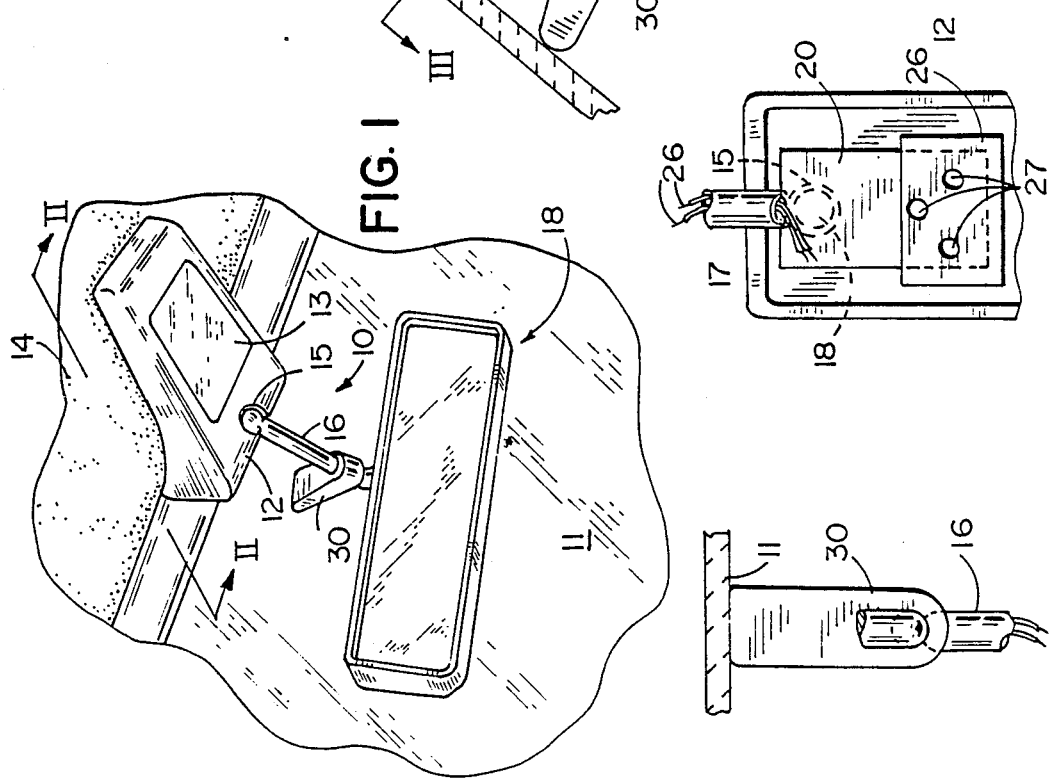

FOLDABLE MOUNT

BACKGROUND OF THE INVENTION

The present invention pertains to a foldable mount to couple a collapsible vehicular accessory to a headliner for shipping and subsequent use.

Vehicle headliners are becoming increasingly modular in design and may include accessories such as visors, map lamps, consoles or rearview mirrors. In the automotive industry, it is currently popular for the automotive companies to purchase such complete subassemblies from an outside supplier for assembly into their vehicles. In the past, rearview mirrors have been assembled to project outwardly from the headliners in an operative position. This construction if applied to a modular headliner requires a substantial amount of additional shipping space above and beyond that ordinarily required for the headliner alone as well as special care in packaging. This additional space and packaging requirement thereby causes a substantial increase in shipping costs. If the mirror assembly is shipped disassembled, an additional assembly step is required by the manufacturer.

SUMMARY OF THE INVENTION

The aforementioned problems and deficiencies are overcome by the present invention, wherein a unique foldable mounting assembly is provided which couples an accessory such as a rearview mirror to the headliner so as to effectively collapse the accessory flat against the headliner for shipping and allow the extension of the accessory for use.

The mounting assembly includes a base adapted for attachment to a headliner and a stem for supporting the accessory. The stem is adjustably mounted to the base for movement between collapsed and operative positions. The movable stem cooperates and interacts with the base and a spring positioned therein to not only urge and hold the stem in a steady operative position, but also to releasably hold the stem and accessory in a collapsed position for shipping.

By using the foldable mount of the present invention, the user is enabled to efficiently ship the integral, structural combination of a vehicular accessory such as a rearview mirror and headliner assembly at substantially lower costs than heretofore available. Moreover, the foldable mount utilizes a minimum of parts which, in turn, also results in lower manufacturing costs.

These and other objects, advantages and features of the present invention will be more fully understood and appreciated by reference to the written specification and following drawings in which:

BRIEF DESCRIPTION OF THE DRAWINGS

FIG. 1 is a perspective view of an overhead console, rearview mirror and headliner assembly embodying the present invention installed within a vehicle;

FIG. 2 is an enlarged partially fragmentary and cross-sectional view taken generally along the section line II—II of FIG. 1;

FIG. 3 is a cross-sectional view taken along section line III—III of FIG. 2; and FIG. 4 is a fragmentary top plan view of the foldable mount of the present invention.

DETAILED DESCRIPTION OF THE PREFERRED EMBODIMENT

In the preferred embodiment, the foldable mounting assembly 10 includes a base 12 fixedly attached to a headliner 14. A stem 16 is adapted to support an accessory such as a rearview mirror 19 to the base 12 with a flat spring 20 positioned in the base to cooperatively interact with the movement of stem 16.

The base 12 is mounted at the center of the vehicle near the windshield 11 and may include an electronic module 13 including, for example, an electronic compass, garage door opening transmitter, map lamps or other vehicle accessories. Base 12 is integrally molded of a suitable rigid polymeric material or can be cast of a suitable metallic alloy and includes a semi-hemispherical ball socket 15 formed therein and facing upwardly for nestably receiving a ball shaped end 17 of stem 16. End 17 includes a flat 18 (FIGS. 2 and 4) formed therein for providing a camming action of the end 17 with respect to the flat spring 20 for holding the stem in a use portion as illustrated in FIGS. 1 and 2. The spring 20 and base 12 are mounted to a structural member 21 in the roof of a vehicle with the headliner 14, comprising a backing member 23 and a decorative fabric 25 suitably laminated together, interposed therebetween.

The base or housing 12 includes a suitable mounting plate 26 for receiving fastening screws 27 and for mounting spring 20. Plate 26 is conventionally integrally formed with base 12 or otherwise suitably attached. Module 13 can be removed from the base 12 for initial installation of the assembly to the headliner. First the end 17 of stem 16 is laid into socket 15 and spring 20 positioned above flat 18. Screws 27 are then extended through apertures in the spring 20 and plate 26 and snugged into position through apertures in headliner 14 for subsequent alignment and tightening into the roof's mounting support structure 21 of the vehicle. Stem 16 may be hollow in the preferred embodiment for receiving a pair of electrical conductors 26 for use in supplying electrical signals to electrically operated accessories in mirror 19. The end of stem 16 remote from end 17 also includes a conventional ball, mount 28 for attachment of the mirror assembly 19 to the stem.

A molded polymeric snugger 30 is molded directly to the stem 16 in a method taught in U.S. Pat. No. 4,352,518 and has an end which engages the windshield 11 to provide, in connection with the bias force of spring 20 urging stem 16 forwardly toward the windshield, an anti-rattle mounting of the rearview mirror assembly with respect to the vehicle.

Once installed to the headliner as illustrated, the assembly 10 is shipped in a position nested against the headliner as shown in phantom lines in FIG. 2 to provide a compact package and protected shipment for the rearview mirror assembly 19 or other accessories attached to the stem. When received by the auto manufacturer, assembly is snapped into position by pivoting the stem downwardly as indicated by arrow A in FIG. 2, pivoting snubber 30 from the 90° rotated position for shipment as shown in phantom to the position shown in solid lines in FIG. 3 in a direction indicated by arrow B, and pivoting the mirror 19 downwardly to a generally use position as indicated by arrow C. This extension of the assembly to the use position typically will be done after headliner 14 is installed in the vehicle. As stem 16 approaches the use position shown in solid lines in FIG. 2, the flat spring 20 will ride over the ball 17 end of the stem until it approaches the intersection of the spherical ball portion with flat 18. At this intersection, the spring tends to center the flat 18 in a stable position as illustrated in FIG. 2 to in effect "snap" the stem into a locked use position. This operation assures in connection also with the snubber mount 30 a rattle-free compact mount for the vehicle accessories such as a rearview mirror 19 illustrated.

It will become apparent to those skilled in the art that various modifications to the preferred embodiment of the invention can be made without departing from the spirit or scope as defined by the appended claims.

The embodiments of the invention in which an exclusive property is claimed are defined as follows:

1. A modular headliner system including a foldable mount for a vehicle accessory mounted to a generally planar headliner for attachment to the roof structure of a vehicle comprising:
    a vehicle headliner;
    a base member for attachment to said headliner and including means for pivotally receiving a stem;
    a stem having one end pivotally mounted to said base and including an opposite end for receiving a vehicle accessory; and
    a flat spring and a ball having a flat formed thereon defining locking means cooperatively coupled between said one end of said stem and said base to allow said stem to be pivoted between a position in which said accessory is closely adjacent the headliner for shipment of the modular headliner for locking said stem into a single use position with said opposite end extended away from said headliner.

2. The apparatus as defined in claim 1 wherein said locking means includes said spring flat mounted to said base and engaging said one end of said stem.

3. The apparatus as defined in claim 2 wherein said one end of said stem comprises said ball and, said means in said base for pivotally receiving said stem comprises a socket for pivotally receiving said ball end of said stem.

4. A modular headliner system including a foldable mount for a vehicle accessory mounted to a generally planar headliner for attachment to the roof structure of a vehicle comprising:
    a vehicle headliner;
    a base member for attachment to said headliner and including means for pivotally receiving a stem;
    a stem having one end pivotally mounted to said base and including an opposite end for receiving a vehicle accessory; and
    camming means cooperatively coupled between said one end of said stem and said base to allow said stem to be pivoted between a position in which said accessory is closely adjacent the headliner for shipment of the modular headliner and a use position in which said stem is locked into a use position with said opposite end extended away from said headliner, wherein said camming means includes spring means mounted to said base and engaging said one end of said stem, and wherein said one end of said stem comprises a ball and, said means in said base for pivotally receiving said stem comprises a socket for pivotally receiving said ball end of said stem, and wherein said ball has a flat formed therein and wherein said spring comprises a flat spring engaging said flat to lock said stem in a lowered use position.

5. The apparatus as defined in claim 4 wherein said opposite end of said stem is adapted for receiving a rear view mirror.

6. The apparatus as defined in claim 5 wherein said modular assembly further includes an elongated snubber molded on said stem and including a rounded end for engaging the windshield of a vehicle to provide a stable rattle-free mount.

7. A foldable mount for securing a vehicle accessory to a vehicle comprising:
    a base member for attachment to the panel and including means for pivotally receiving a mounting stem thereto;
    a stem pivotally mounted to said base at one end thereof and including an opposite end for receiving a vehicle accessory; and
    a flat spring and a ball having a flat formed thereon defining locking means cooperatively coupled between said one end of said stem and said base to allow said stem to be pivoted between a position in which said accessory is closely adjacent the panel for shipment of the panel and for locking said stem into a single use position with said opposite end extended away from said panel.

8. A foldable mount for securing a vehicle accessory to a vehicle panel comprising:
    a base member for attachment to the panel and including means for pivotally receiving a mounting stem thereto;
    a stem pivotally mounted to said base at one end thereof and including an opposite end for receiving a vehicle accessory;
    locking means cooperatively coupled between said one end of said stem and said base to allow said stem to be pivoted between a position in which said accessory is closely adjacent the panel for shipment of the panel and for locking said stem into a single use position with said opposite end extended away from said panel; and
    wherein said one end of said stem includes a flat and wherein said locking means includes flat spring means mounted to said base and engaging said flat of said stem to lock said stem into the use position.

9. The apparatus as defined in claim 8 wherein said one and of said stem comprises a ball end said means in said base for pivotally recieving said stem comprises a socket for pivotally receiving said ball end of said stem.

10. The apparatus as defined in claim 9 wherein said stem includes an elongated snubber molded on said stem and extending forwardly and including a rounded end for engaging a windshield of a vehicle in which said foldable mount is installed to provide a stable rattle-free mount for said accessory.

* * * * *

UNITED STATES PATENT AND TRADEMARK OFFICE
CERTIFICATE OF CORRECTION

PATENT NO. : 4,899,975

DATED : February 13, 1990

INVENTOR(S) : Michael J. Suman

It is certified that error appears in the above-identified patent and that said Letters Patent is hereby corrected as shown below:

Column 2, Line 22
"portion" should be --position--

Column 4, Line 17
After "vehicle" insert --panel--

Column 4, Line 52
"one and" should be --one end--

Column 4, Line 52
"ball end" should be --ball and--

Signed and Sealed this

Third Day of December, 1991

Attest:

HARRY F. MANBECK, JR.

*Attesting Officer*  *Commissioner of Patents and Trademarks*